United States Patent [19]
Stowe et al.

[11] Patent Number: 4,632,513
[45] Date of Patent: Dec. 30, 1986

[54] METHOD OF MAKING A POLARIZATION-INSENSITIVE, EVANESCENT-WAVE, FUSED COUPLER WITH MINIMAL ENVIRONMENTAL SENSITIVITY

[75] Inventors: David W. Stowe, Buffalo Grove; Paul M. Kopera, Franklin Park, both of Ill.

[73] Assignee: Gould Inc., Rolling Meadows, Ill.

[21] Appl. No.: 705,044

[22] Filed: Feb. 25, 1985

Related U.S. Application Data

[63] Continuation of Ser. No. 498,436, May 26, 1983, abandoned.

[51] Int. Cl.⁴ ............................................. G02B 6/26
[52] U.S. Cl. ...................... 350/320; 156/166; 156/629; 350/96.15
[58] Field of Search ............ 350/96.15, 96.16, 320; 156/626, 629, 157, 158, 166

[56] References Cited

U.S. PATENT DOCUMENTS

| | | | |
|---|---|---|---|
| 3,372,969 | 3/1968 | Snitzer | 350/96.33 |
| 3,759,316 | 5/1971 | Dyott et al. | 65/4 |
| 3,957,341 | 5/1976 | Taylor | 350/96.15 |
| 4,054,366 | 10/1977 | Barnoski et al. | 350/96.15 |
| 4,083,625 | 4/1978 | Hudson | 350/96.15 |
| 4,087,156 | 5/1978 | Kao et al. | 350/96.21 |
| 4,113,345 | 9/1978 | Gerndt | 350/96.15 |
| 4,136,929 | 1/1979 | Suzaki | 350/96.15 |
| 4,264,126 | 4/1981 | Sheem | 350/96.15 |
| 4,265,699 | 5/1981 | Ladany | 156/657 |
| 4,291,940 | 9/1981 | Kawasaki et al. | 350/96.15 |
| 4,302,071 | 11/1981 | Winzer | 350/96.20 |
| 4,315,666 | 2/1982 | Hicks, Jr. | 350/96.15 |
| 4,330,170 | 5/1982 | Johnson et al. | 350/96.16 |
| 4,336,047 | 6/1982 | Pavlopoulos et al. | 65/3.31 |
| 4,342,499 | 8/1982 | Hicks, Jr. | 350/96.15 |
| 4,354,760 | 10/1982 | Schiffner | 356/350 |
| 4,387,954 | 6/1983 | Beasley | 350/96.15 |
| 4,400,055 | 8/1983 | Ozeki et al. | 350/96.15 |
| 4,426,215 | 1/1984 | Murphy | 65/4.21 |
| 4,439,221 | 3/1984 | Smyth et al. | 156/158 X |
| 4,474,431 | 10/1984 | Bricheno | 350/96.15 |
| 4,490,163 | 12/1984 | Jochem et al. | 350/96.15 X |
| 4,493,528 | 1/1985 | Shaw et al. | 350/96.15 |

FOREIGN PATENT DOCUMENTS 53-91752 8/1978 Japan.
53-15149 11/1978 Japan.

OTHER PUBLICATIONS

Bergh et al., "Single-Mode Fibre Optic Directional Coupler", *Electronics Letters*, vol. 16, No. 7, Mar. 1980, pp. 260-261.
Tran et al., "Single-Mode Fiber Directional Couplers Fabricated by ...", *IEEE Journal of Quantum Elect.*, vol. QE-17, No. 6, Jun. 1981, pp. 988-991.
Proceedings SPIE, vol. 417, Apr. 1983, Arlington, Virginia, "Evanescent Wave Fiber Optic Couplers: Three Methods", Beasley et al., pp. 36-42.
ITT Electro-Optical Products Division, "Single-Mode Coupler Research at ITT", M. H. Slonecker, pp. 1-10.
Advances in Ceramics 2, 1981, "Evanescent Wave Coupling of Optical Fibers", V. J. Tekippe, pp. 48-52.
ITT Electro-Optical Products Division, (Abstract), "Fused Optical Coupler Manufacturing Technology", Williams et al., p. 34.
Applied Physics Letters, vol. 28, No. 9, May 1, 1976, "Optical Directional Coupler Using Tapered Sections in Multimode Fibers", Ozeki et al., pp. 528-529.
"Fused Single Mode Fibre Access Couplers", Villarruel et al., *Electronics Letters*, Mar. 19, 1981, vol. 17, No. 6.

(List continued on next page.)

*Primary Examiner*—John Lee

[57] ABSTRACT

An optical coupler and method of making same is described. The coupling ratio of the coupler is polarization-insensitive. The optical coupler described herein is made from single-mode optical fibers. Each optical fiber has a length of nearly exposed core which is fused to the exposed core of the other optical fiber while the fibers are maintained in parallel juxtaposition with one another without twisting. By creating a fused core coupler from single-mode optical fibers in which the cores are in parallel juxtaposition with one another, the coupling ratio of the subject invention does not change with changes in polarization of light passing through each single-mode fiber and, thus, is polarization insensitive.

18 Claims, 4 Drawing Figures

OTHER PUBLICATIONS

Canada Wire and Cable Co., Fiber and Integrated Optics, vol. 3; 2-3 (1980), "A Review of Biconical Taper Couplers", Szarka et al., pp. 285-299.
Siemens AG, Siemens Forsch, u. Ber. De 10, No. 3, (1981), "Coupling Properties of a Double-Core Single-Mode Optical Fiber", Schoner et al., pp. 172-178.
Beasley Abstract, Oct. 28, 1981, 1981 Annual Meeting-Optical Soc. of America.
TASK I—Final Technical Report N00173-80-C-0260, Gould Labs., pp. 1-24.
TASK III—Final Technical Report N00173-80-C-0260, "Fabrication of Evanescent-Wave Couplers from Single-Mode Fibers", Beasley et al., pp. 1-66.
Fiber Optic Couplers-Final Report for Period Apr. 17, 1978-May 19, 1979, G. W. Bickel et al.
Optics Letters, vol. 6, No. 7, Jul. 1981, "Biconical-Taper Single-Mode Fiber Coupler", Kawasaki et al., pp. 327-328.

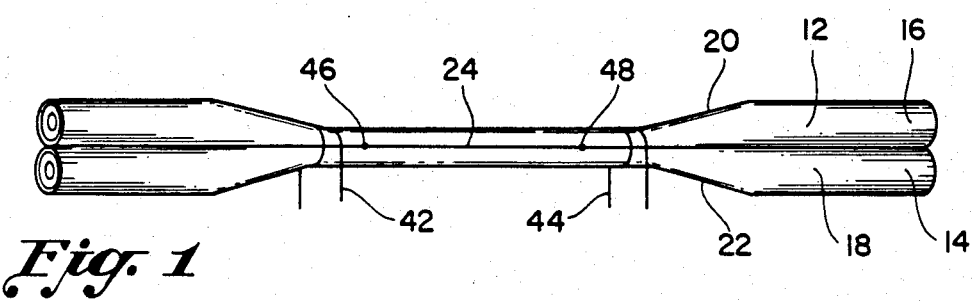
Fig. 1
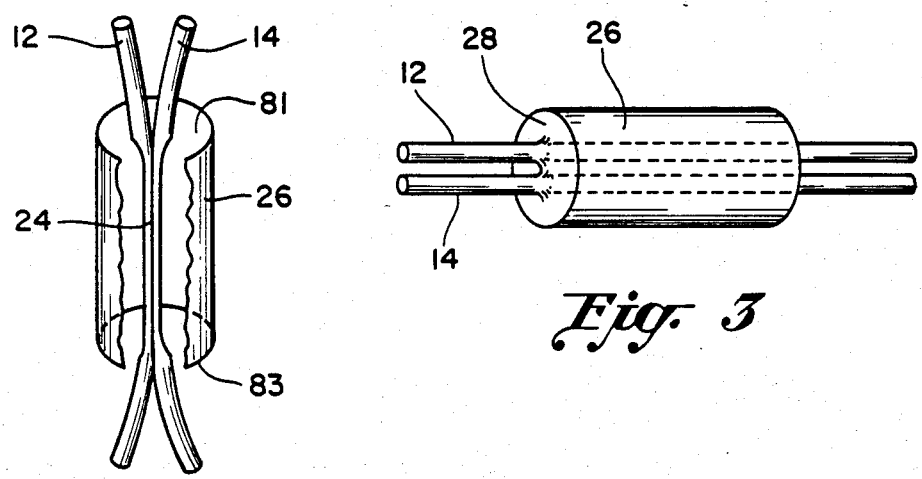
Fig. 2
Fig. 3
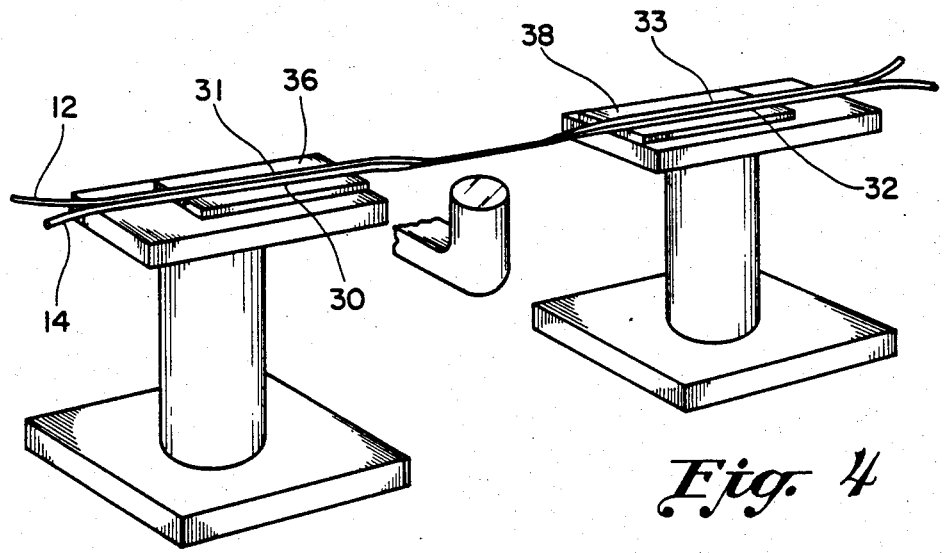
Fig. 4

METHOD OF MAKING A POLARIZATION-INSENSITIVE, EVANESCENT-WAVE, FUSED COUPLER WITH MINIMAL ENVIRONMENTAL SENSITIVITY

This is a continuation of co-pending application Ser. No. 498,436 filed on May 26, 1983, now abandoned.

BACKGROUND OF THE INVENTION

A. Field of the Invention

The present invention relates generally to optical waveguide couplers and more specifically to optical couplers using single-mode optical fibers that are resistant to polarization changes.

B. Description of the Prior Art

Fiber optic couplers are commonly used to transfer light from one optical waveguide to another for a variety of functions. For example, fiber optic couplers are used in the communications field to rapidly convey larger amounts of data. Other applications include measurement systems in which high-precision measurements are made based upon an environmentally dependent shift in either the phase or wavelength of light traveling through an optical waveguide. Early couplers used for measurement applications had several disadvantages. For instance, the coupling ratio of early couplers typically varied with the polarization of the light passing through the coupler. Furthermore in some cases, the phase of the light passing through the coupler varied with polarization which was unsatisfactory for certain interferometric sensor aplications such as the passive quadrature demodulator coupler matrix.

Much of the technology developed in the past ten years for manufacturing couplers has centered around couplers which use multimode fibers. Multimode optical fibers are fairly large fibers, having a core diameter on the order of 40 microns to 200 microns. Some multimode fibers may be as large as 4 millimeters. While multimode fibers can be used to produce couplers for transferring polarized light from one fiber to another, they are typically undesirable because polarized light transmitted in a multimode optical fiber has a tendency to become depolarized. Single-mode fibers, on the other hand, are more capable of transmitting polarized light with minimal depolarization of light during transmission over small distances. Due to the method in which single-mode fibers act to transmit only one mode of light, the core diameter of a single-mode fiber is approximately ten times smaller than the core diameter of a multimode fiber. This has led to serious difficulties in manufacturing couplers using single-mode fibers. The invention described hereinbelow represents an advancement in the art in that it teaches methods for coupling single-mode fibers and for producing polarization-insensitive optical couplers.

Before describing the applicants' invention however, it is necessary to briefly describe the physical characteristics of a typical optical fiber. In most instances, a fiber comprises an inner core having a relatively high index of refraction, a cladding having a relatively low index of refraction, and a substrate having a relatively high index of refraction, but not necessarily equal to the index of refraction of the core. This type of fiber is commonly called "W-fiber" by those skilled in the art because the index profile of the fiber appears to resemble a "W". It should be noted that other types of fibers do not have an outer substrate having a relatively high index of refraction.

SUMMARY OF THE INVENTION

The subject development comprehends a polarization-insensitive optical device for coupling light which includes a first single-mode optical fiber having a first longitudinal segment having an inner core having a relatively high index and a cladding having a relatively low index of refraction. The optical device also includes a second single-mode optical fiber having a second longitudinal segment having an inner core having a relatively high index of refraction and a cladding having a relatively low index of refraction. A coupling region is included in the subject device having the first and second longitudinal portions fused together in parallel juxtaposition to one another. The coupler further includes a housing means for maintaining the first and second longitudinal portions substantially straight and for maintaining the first and second longitudinal portions in a stable environment.

The invention further comprehends a method of making polarization-insensitive optical couplers comprising the steps of exposing first and second longitudinal cladding segments of first and second single-mode optical fibers; maintaining the optical fibers in linear parallel juxtaposition with one another along a portion of the exposed longitudinal segments; fusing the parallel juxtaposition segments of the fibers together to form a coupling region, and rigidly encapsulating the coupling region of the optical fibers while maintaining the linear parallel juxtaposition of the fibers.

In view of the preceding, an object of the invention described herein is to provide a polarization-insensitive coupler which is simple to fabricate using single-mode optical fibers.

It is a further object of the invention to provide an environmentally stable single-mode optical fiber.

It is a further object of the invention to provide a single-mode coupler device having controlled coupling.

These objects are given only by way of example; thus, other objectives and advantages inherently achieved by the disclosed invention may occur to those skilled in the art. The scope of the invention is to be limited only by the appended claims.

BRIEF DESCRIPTION OF THE DRAWINGS

FIG. 1 is a frontal view of one embodiment of the coupler described herein indicating the coupling region;

FIG. 2 is a frontal view of one embodiment of the coupler described herein illustrating a quartz housing in which the housing is broken away to provide a view of the coupling region;

FIG. 3 is an illustration partially in phantom of one embodiment of the subject coupler after encapsulation; and FIG. 4 is an isometric illustration of one embodiment of the equipment used to fabricate the couplers described herein.

DETAILED DESCRIPTION OF THE PREFERRED EMBODIMENT

As discussed above, single-mode fibers are extremely fragile because of their minute size. The subject development, therefore, has been directed to providing a single-mode coupler which is relatively rugged, and is relatively insensitive, or stable, with respect to changes in polarization. Referring now to FIG. 1, first and second signal-mode optical fibers 12, 14 are provided in the preferred embodiment of the subject development. Each optical fiber 12, 14 has a respective substrate 16, 18 and core and cladding 20, 22. The diameter of the core of each single-mode fiber is on the order of 5 microns whereas the diameter of the cladding of each fiber is on the order of 75-125 microns. Thus, it should be recognized that when the core 20, 22 of each fiber is exposed, it is in a relatively delicate, or fragile, state. In the preferred embodiment of the subject development, each fiber 12, 14 has a longitudinal segment having a core and cladding diameter 20, 22 of appproximately 15-50 microns. It should be obvious to one skilled in the art that the length of the longitudinal segment can be varied greatly without deviating from the intent of the subject invention. In the preferred embodiment, the exposed core length is approximately one centimeter in order to ensure complete coupling between the first optical fiber 12 and the second optical fiber 14. The longitudinal segments 20, 22 are fused together in coupling region 24. The invention described herein comprehends that throughout the coupling region, the first and second fibers 12 and 14 have cores which are maintained in linear parallel juxtaposition with one another.

Referring now to FIG. 2, the fused fibers 12, 14 of FIG. 1 are illustrated in a rigid housing 26. The method of placing the fused fibers within the housing will be discussed in greater detail hereinbelow. It is important to note, at this point however, that the housing provides a rigid support to fused fibers 12 and 14 throughout coupling region 24.

Referring now briefly to FIG. 3, after fibers 12 and 14 have been positioned in housing 26, the entire assembly is encapsulated in a rubber-like material 28. Encapsulation of the assembly provides a further means for stabilizing the subject device. The encapsulation material may provide strain relief to the ends of the fibers which extend beyond the housing because the housing may be encapsulated by a dipping technique in which the ends of the fibers are also coated with the encapsulation material.

The following description represents the currently preferred method of making the subject couplers. In the preferred embodiment, two single-mode fibers are prepared. A variety of single-mode fibers may be used, depending on the wavelength of operation of the coupler. Each coupler would be designed to be laser specific, that is, the fiber used for one wavelength of light may be made from a different material, and have a different core diameter and index of refraction than a coupler designed for another wavelength of operation. Important characteristics of any fiber chosen include: good concentricity, excellent core uniformity, and an appropriate refractive index profile. While various lengths of optical fiber may be used, the present procedure in the laboratory is to use two lengths of optical fiber that are 50 centimeters long. Each fiber has a plastic jacket and an RTV (room temperature vulcanizing silicone) coating. The plastic jacket is cut away and any RTV is removed with a hydrofluoric acid rinse.

Referring now to FIG. 4, after the fibers have been prepared as discussed above, each fiber 12 and 14 is placed in respective groves 30-33 of clamping devices 36, 38. The fibers are then cleaned with a hydrofluoric acid/water/alcohol rinse according to techniques known to those skilled in the art. After each fiber has been inspected for cleanliness, etching of the fibers is initiated. It is the object of the etching portion of the procedure to remove the substrate 16 and 18 of each fiber 12 and 14 (FIG. 1) to expose core and cladding 20 and 22 along a coupling region 24 of each of the fibers so as to provide an appropriate index profile. An appropriate index profile is one in which the outer surface, or cladding, of each fiber has a lower index of refraction than the core of each fiber. Although a variety of etching techniques may be used, in view of the particular fiber used in the preferred embodiment, it is desirable to etch the subject fibers by a heated etching technique. In this technique, the fibers are placed in close proximity to an etching station which is heated by a thermoelectric module. A drop of etchant is placd on top of the etching station to etch a longitudinal portion of the fiber. After the fiber has been etched to the desired diameter, the fibers are then rinsed with water to prevent further etching. The very fragile etched longitudinal segments 20, 22 are then brought in parallel juxtaposition with one another by wrapping opposite ends of each exposed core length to one another with a thread or other wrapping material 42, 44. In the preferred embodiment, it has been found that a thin plastic sheet is desirable to prevent breakage of the fragile cores 20, 22. After the cores have been temporarily wrapped as discussed above to provide the desired parallel juxtaposition special relationship, a small drop of adhesive material is deposited on each end 46, 48 of the exposed core length adjacent to threads 42, 44. The glue is allowed to cure so that the cores 20, 22 remain in parallel juxtaposition with one another throughout coupling region 24 when threads 42 and 44 are removed from the exposed cores 20, 22.

The coupling region of the fibers 12, 14 are then heated. In the laboratory technique used in the preferred embodiment, a lighted torch is simply passed along the coupling region 24 while the longitudinal segments are in axial tension until the segments 20, 22 are fused together throughout the length of the coupling region. A quartz tube 26 is then measured and cut to the desired length to surround the exposed cores of the subject coupler. In one embodiment, a slot extending the length of the quartz tube 26 may be provided to allow insertion of the tube about fibers 12, 14. In another embodiment, the tube may be cut in half longitudinally to allow each half to be simply placed about the fibers. The ends of the fibers 12, 14 are then glued to the ends 81, 83 of the quartz tube to suspend the etched and fused segments of the fibers containing the coupling region 24 in the approximate center of the tube 26. The glued assembly is then allowed to cure as necessary. The quartz tube is then dipped in a material to provide an elastic covering over tube 26.

The invention described herein is insensitive to changes in polarization due to its unique design. In other single-mode, evanescent-wave couplers, birefringence resulting from twists, bends, stresses, or strains imposed on the fibers will cause changes in polarity of light transmitted through the fibers. It is common practice in coupler manufacture to twist a pair of fibers about one another in order to maintain contact during fusing. By eliminating the need to twist the fibers about one another and by making bends in the fiber as gradual as possible, the polarization dependence of the coupling ratio is eliminated.

Although the invention has been described and illustrated in detail, it is to be clearly understood that the same is by way of illustration an example only, and is not to be taken by way of limitation; the spirit and scope of this invention being limited only by the terms of the appended claims.

We claim:

1. A method of making a polarization-insensitive optical coupler comprising the steps of:
   (a) etching first and second longitudinal segments of first and second single-mode optical fibers so that each fiber has an outer cladding having a low index of refraction relative to the index of refraction of a nearly exposed core of each of the first and second single-mode optical fibers;
   (b) maintaining the first and second single-mode optical fibers in parallel juxtaposition with one another along a portion of each of the first and second longitudinal segment, said maintaining step comprising the substeps of:
      (b1) wrapping portions of the first and second longitudinal segments with a material which will not substantially deform the nearly exposed cores of the first and second single-mode optical fibers;
      (b2) gluing the nearly exposed cores of the first and second single-mode optical fibers together with glue while the nearly exposed cores are wrapped;
      (b3) curing the glue; and
      (b4) unwrapping the nearly exposed cores;
   (c) fusing together the portions of the first and second longitudinal segments maintained in parallel juxtaposition to form a coupling region; and
   (d) rigidly encapsulating the nearly exposed cores of the first and second single-mode optical fibers while maintaining the parallel juxtaposition of the first and second longitudinal segments.

2. A method of making a polarization-insensitive optical coupler as recited in claim 1, wherein said step (a) comprises etching the first and second longitudinal segments along a length in the range of 0.5 to 2 cm.

3. A method of making a polarization-insensitive optical coupler as recited in claim 1, wherein said step (a) includes removing an outer jacket of each of the first and second single-mode optical fibers along the length of the nearly exposed cores of the first and second single-mode optical fibers.

4. A method of making a polarization-insensitive optical coupler as recited in claim 1, wherein said step (a) includes rinsing the first and second longitudinal segments of the first and second single-mode optical fibers in hydrofluoric acid to remove any room temperature vulcanizing rubber which may be surrounding the cladding of the first and second single-mode optical fibers.

5. A method of making a polarization-insensitive optical coupler as recited in claim 1, wherein said step (b) includes aligning the first and second single-mode optical fibers in a holder having alignment grooves prior to said substep (b1).

6. A method of making a polarization-insensitive optical coupler as recited in claim 1, wherein said step (d) includes the substeps of:
   (d1) placing a tube having ends and having a length substantially the same as the first and second longitudinal segments over the coupling region;
   (d2) gluing the ends of the tube to the first and second single-mode optical fibers with glue to suspend the fibers within the tube; and
   (d3) curing the glue.

7. A method of making a polarization-insensitive optical coupler comprising the steps of:
   (a) etching first and second longitudinal segments of first and second single-mode optical fibers so that each fiber has an outer cladding have a low index of refraction relative to the index of refraction of a nearly exposed core of each of the first and second single-mode optical fibers;
   (b) maintaining the first and second single-mode optical fibers in parallel juxtaposition with one another along a portion of each of the first and second longitudinal segments while placing the first and second longitudinal segments under axial tension;
   (c) fusing the parallel juxtaposition portions of the first and second longitudinal segments together while the first and second longitudinal segments are maintained in parallel juxtaposition and remain under axial tension, so that a coupling region is formed.

8. A method of making a polarization-insensitive optical coupler as recited in claim 7, further comprising the step of rigidly encapsulating the nearly exposed cores of the first and second single-mode optical fibers while maintaining the parallel juxtaposition of the first and second longitudinal segments.

9. A method of making a polarization-insensitive optical coupler as recited in claim 8, wherein said encapsulating step comprises rigidly encapsulating the nearly exposed cores of the first and second single-mode optical fibers in a quartz tube.

10. A method of making a polarization-insensitive optical coupler as recited in claim 7, wherein said step (b) comprises the substeps of:
    (b1) wrapping portions of the first and second longitudinal segments with a material which will not substantially deform the nearly exposed cores of the first and second single-mode optical fibers;
    (b2) bonding the nearly exposed cores of the first and second single-mode optical fibers together while the nearly exposed cores of the first and second single-mode optical fibers are wrapped; and
    (b3) unwrapping the nearly exposed cores of the first and second single-mode optical fibers.

11. A method of making a polarization-insenstive optical coupler as recited in claim 10, wherein said substep (b2) comprises:
    gluing the nearly exposed cores of the first and second single-mode optical fibers together with glue while the nearly exposed cores are wrapped; and curing the glue.

12. A method of making a polarization-insensitive optical coupler as recited in claim 10, wherein said substep (b1) comprises wrapping portions of the first and second longitudinal segments with a thin plastic sheet.

13. A method of making a polarization-insensitive optical coupler comprising the steps of:
    (a) etching first and second longitudinal segments of first and second single-mode optical fibers so that each fiber has an outer cladding having a low index of refraction relative to the index of refraction of a nearly exposed core of each of the first and second single-mode optical fibers;
    (b) maintaining the first and second single-mode optical fibers in parallel juxtaposition with one another along a portion of each of the first and second longitudinal segments, said maintaining step including the substeps of:

(b1) wrapping portions of the first and second longitudinal segments with a material which will not substantially deform the nearly exposed cores of the first and second single-mode optical fibers;

(b2) bonding the nearly exposed cores of the first and second single-mode optical fibers together while the nearly exposed cores of the first and second single-mode optical fibers are wrapped; and (b3) unwrapping the nearly exposed cores of the first and second single-mode optical fibers; and (c) fusing the parallel juxtaposition portions of the first and second longitudinal segments together to form a coupling region.

14. A method of making a polarization-insensitive optical coupler as recited in claim 13, wherein said substep (b1) comprises wrapping portions of the first and second longitudinal segments with a thin plastic sheet.

15. A method of making a polarization-insensitive optical coupler as recited in claim 14, wherein said substep (b2) comprises:

gluing the nearly exposed cores of the first and second single-mode optical fibers together with glue while the nearly exposed cores are wrapped; and curing the glue.

16. A method of making a polarization-insensitive optical coupler as recited in claim 13, further comprising the step of rigidly encapsulating the nearly exposed cores of the first and second single-mode optical fibers while maintaining the parallel juxtaposition of the first and second longitudinal segments.

17. A method of making a polarization-insensitive optical coupler as recited in claim 16, wherein said encapsulating step comprises rigidly encapsulating the nearly exposed cores of the first and second single-mode optical fibers in a quartz tube.

18. A method of making a polarization-insensitive optical coupler as recited in claim 16, wherein:

said maintaining step (b) further comprises the substep of placing the first and second longitudinal segments under axial tension; and said fusing step (c) comprises fusing the parallel juxtaposition portions of the first and second longitudinal segments together while the first and second longitudinal segments are maintained in parallel juxtaposition and remain under axial tension.

* * * * *